US006980812B1

(12) United States Patent
Sandhu et al.

(10) Patent No.: US 6,980,812 B1
(45) Date of Patent: Dec. 27, 2005

(54) SYSTEM AND METHOD FOR PROVIDING A HANDHELD UNIT TO A MOBILE POSITION DEVICE

(75) Inventors: Kulbir S. Sandhu, San Jose, CA (US); Rodric C. Fan, Fremont, CA (US)

(73) Assignee: @Road, Inc., Fremont, CA (US)

( * ) Notice: Subject to any disclaimer, the term of this patent is extended or adjusted under 35 U.S.C. 154(b) by 627 days.

(21) Appl. No.: 09/710,491

(22) Filed: Nov. 9, 2000

(51) Int. Cl.[7] .............................. H04Q 7/20; G01S 5/02
(52) U.S. Cl. ................ 455/456.1; 455/427; 455/556.1; 455/557; 455/569.2; 342/357.1; 701/207; 701/213
(58) Field of Search .............................. 455/456.1–457, 455/427, 404.2, 42.1, 556.1–557, 422.1, 455/11.1–12.1, 95; 342/357.01–357.17; 701/207–208, 701/213

(56) References Cited

U.S. PATENT DOCUMENTS

| 4,807,256 | A |   | 2/1989  | Holmes et al. ............... 375/97 |
|-----------|---|---|---------|-------------------------------------|
| 5,021,792 | A |   | 6/1991  | Hwang ....................... 342/357 |
| 5,268,695 | A |   | 12/1993 | Dentinger et al. .......... 342/352 |
| 5,359,529 | A | * | 10/1994 | Snider ........................ 701/210 |
| 5,412,573 | A |   | 5/1995  | Barnea et al. .............. 364/449 |
| 5,488,559 | A |   | 1/1996  | Seymour ..................... 364/449 |
| 5,504,482 | A |   | 4/1996  | Schreder ...................... 340/995 |
| 5,534,875 | A |   | 7/1996  | Diefes et al. ............... 342/357 |
| 5,546,092 | A |   | 8/1996  | Kurokawa et al. .......... 342/357 |
| 5,548,293 | A |   | 8/1996  | Cohen ......................... 342/357 |
| 5,612,875 | A |   | 3/1997  | Haendel et al. ........ 364/424.04 |
| 5,680,312 | A |   | 10/1997 | Oshizawa et al. .......... 364/444 |
| 5,760,742 | A | * | 6/1998  | Branch et al. .............. 701/207 |
| 5,819,199 | A |   | 10/1998 | Kawai et al. ............... 701/200 |
| 5,848,373 | A |   | 12/1998 | DeLorme et al. ........... 701/200 |
| 5,864,708 | A | * | 1/1999  | Croft et al. ..................... 710/1 |
| 5,940,471 | A | * | 8/1999  | Homayoun .................. 455/424 |
| 5,959,577 | A | * | 9/1999  | Fan et al. ............... 342/357.13 |
| 6,073,031 | A | * | 6/2000  | Helstab et al. .............. 455/557 |
| 6,185,427 | B1| * | 2/2001  | Krasner et al. .......... 342/357.1 |
| 6,453,237 | B1| * | 9/2002  | Fuchs et al. ................. 701/213 |
| 6,701,153 | B1| * | 3/2004  | Chang et al. ............. 455/456.1 |
| 2002/0142797 | A1 | * | 10/2002 | Tarighi et al. .............. 455/556 |
| 2004/0180670 | A1 | * | 9/2004  | Pande et al. ............. 455/456.1 |

* cited by examiner

*Primary Examiner*—Emmanuel L. Moise
*Assistant Examiner*—Kamran Afshar
(74) *Attorney, Agent, or Firm*—MacPherson Kwok Chen & Heid LLP

(57) ABSTRACT

A method for facilitating a commercial transaction based on a current location of a mobile customer and a mobile merchant provides opportunity for commercial transaction not previously possible. In one application, the method establishes a wireless link between a server on a wide-area network and mobile customer, and obtains from the mobile customer a current location by reading automatically from a positioning device associated and located with said customer. Based on the current location so obtained, the server matches the mobile customer, as one party of the commercial transaction, with one or more business concern within a predetermined distance from the current location, so that the business concern can act as a counter-party to complete the commercial transaction. This and other location-relevant services can be delivered to the mobile person in a system including a positioning device mounted on a vehicle and an associated-handheld unit that the mobile person can carry around as he or she is outside the vehicle in its vicinity. The handheld unit communicates with the positioning device using a second wireless link (e.g., a local RF or infra-red link).

15 Claims, 4 Drawing Sheets

SYSTEM AND METHOD FOR PROVIDING A HANDHELD UNIT TO A MOBILE POSITION DEVICE

BACKGROUND OF THE INVENTION

1. Field of the Invention

The present invention relates to positioning technology. In particular, the present invention relates to applications of positioning technology to delivering relevant services to a vehicle.

2. Discussion of the Related Art

In recent years, commercial applications based on positioning systems have been developed. These applications are based, for example, on the Global Position System (GPS), or a cellular telephone network (using triangulation method). For example, one position-based system delivering services over the internet is disclosed in U.S. Pat. No. 6,529,159 ("Copending Application"), entitled "Method and Structure for Distribution of Travel Information Using a Network," to Fan et al., filed Mar. 8, 2000, which is a continuation-in-part application of U.S. Pat. No. 5,959,577, filed Aug. 28, 1997. The Copending Application and its parent application are assigned to @Road, Inc., the assignee also of the present invention. The disclosure of the Copending Application is hereby incorporated by reference in its entirety.

SUMMARY OF THE INVENTION

According to one aspect of the present invention, a method for facilitating a commercial transaction based on a current location of a mobile customer is disclosed. In one embodiment of the present invention, the method establishes a wireless link between a server on a wide-area network and a mobile customer, and obtains from the mobile customer a current location by reading automatically from a positioning device associated and located with the customer. Based on the current location so obtained, the server matches the mobile customer, as one party of the commercial transaction, with one or more business concern within a predetermined distance from the current location, so that the business concern can act as a counter-party to complete commercial transaction. In one embodiment, the business concern is also mobile, and the server provides the matching based on both the mobile customer's current position and the business concern's current location. In one instance, the server facilitates the commercial transaction by arranging the business concern or concerns to participate in an on-line auction for the mobile customer's business.

In accordance with another aspect of the present invention, the server obtains from the mobile customer a list of tasks to be performed at specified locations or specified times, as the mobile customer travels from place to place.

According to another aspect of the present invention, a system is disclosed for providing location-relevant services from a server over a wide-area computer network. One embodiment includes a positioning device that receives ranging signals to determine a current position and a first wireless interface for communication with the server. In addition, the positioning device includes a capability for, either through a built-in wireless interface or through an external device, communicating with a handheld device over a second wireless link (e.g., a local RF or infra-red link). The handheld device includes an input device, such as a keyboard, for receiving data over the second wireless link, and an output device, such as a video display, for providing data over the second wireless link. In one application, the second wireless link allows a user of the handheld device to communicate with the server through the positioning device.

In one embodiment, the handheld device includes a cellular telephone to allow an operator of the handheld device to communicate with the server independent of the positioning device. In that instance, the handheld device stores the location of the positioning device when the handheld device communicated with the positioning device. Thus, location-relevant services can still be provided to the operator even though the operator may have traveled outside of the range of the second wireless link. In one embodiment, the handheld device includes a personal digital assistant.

The present invention is better understood upon consideration of the detailed description below and the accompanying drawings.

BRIEF DESCRIPTION OF THE DRAWINGS

In the detailed description below, to provide clarity, and to facilitate correspondence among the figures, like elements in the figures are provided like reference numerals.

DETAILED DESCRIPTION OF THE PREFERRED EMBODIMENTS

Figure 1:
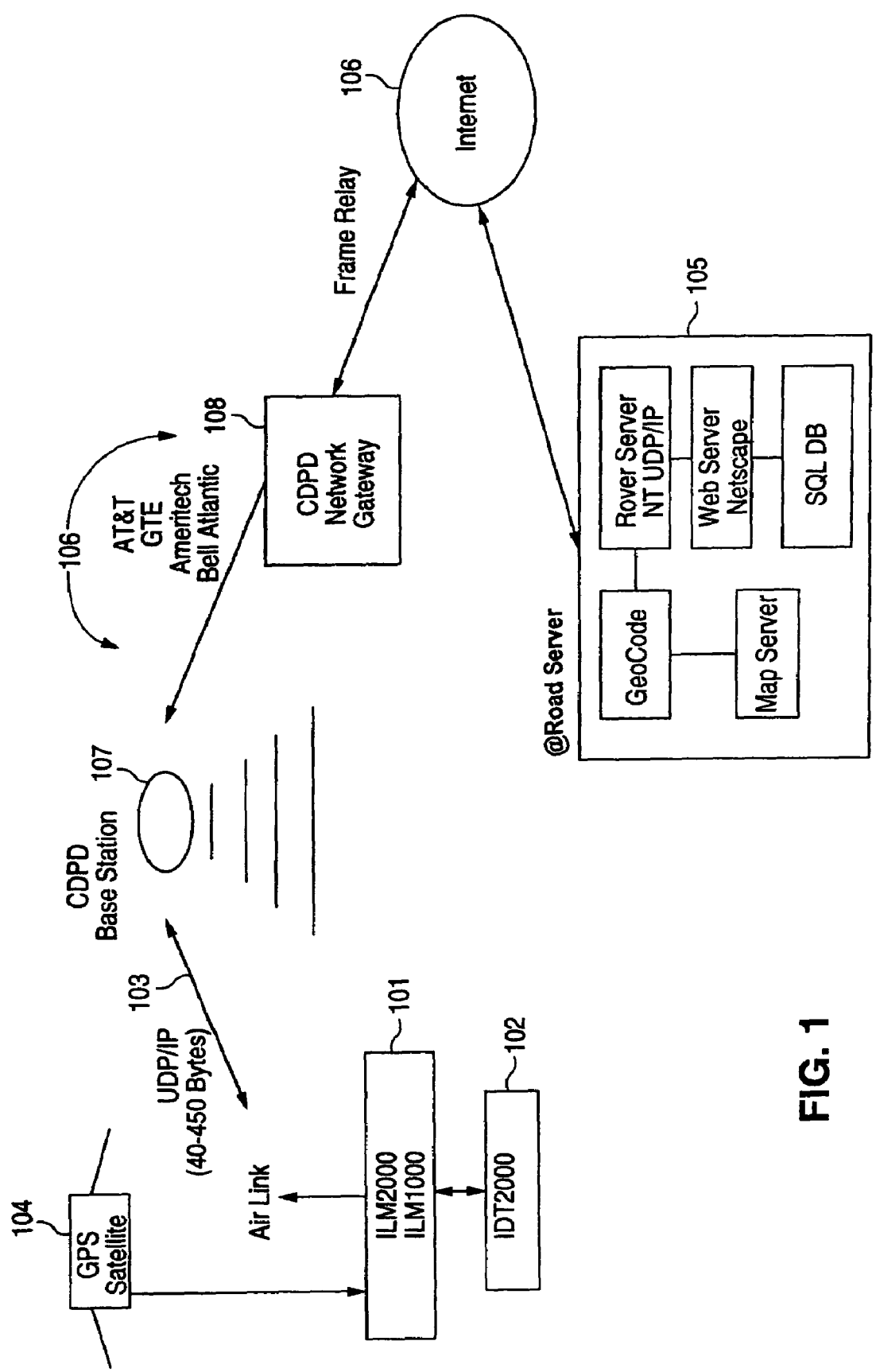
FIG. 1 shows positioning system 100 in which the present invention is applicable.
Figure 2:
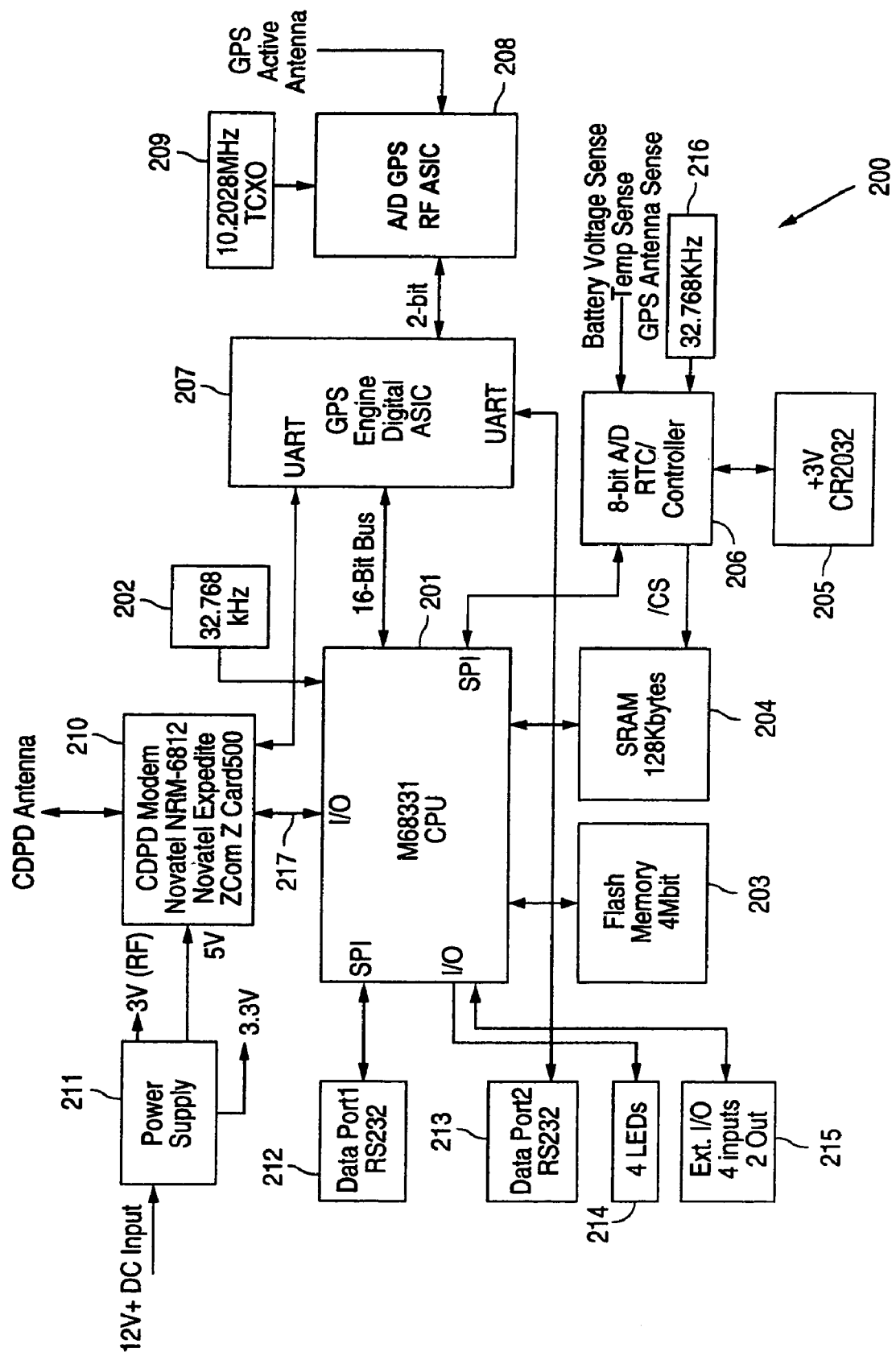
FIG. 2 shows one implementation of ILM 101 by circuit 200.

The present invention provides a system and a method for delivering services to a vehicle or a traveler based on the vehicle or the traveler's location determined in a positioning system. FIG. 1 shows positioning system 100 in which the present invention is applicable. As shown in FIG. 1, positioning system 100 includes an internet location manager (ILM) 101, which is a mobile control device having the capabilities of both obtaining its own position from a positioning system (e.g., GPS) and communicating over a computer network (e.g., the internet) to a server providing services of the present invention. ILM 101 can be provided, for example, in a vehicle. One possible implementation of ILM 101 is shown in FIG. 2, which is discussed in further detail below. As shown in FIG. 1, ILM 101 interacts with a user through, for example, console device 102. Typically, console device 102 includes a keyboard or a pointing device for data entry, and a display for output of information.

ILM 101 receives from the positioning system (e.g., GPS satellite 104) position input information, which is processed to provide ILM 101's current position. In addition, ILM 101 communicates over wireless link 103 (e.g., a CDPD, GSM, iDEN, CDMA or another wireless or cellular telephone communication link) with server 105, which delivers location relevant services to ILM 101 over wide area network 106 (e.g., the internet). As shown in FIG. 1, wireless link 103 connects ILM 101 with wireless communication system 106 that includes cellular telephone network 107 and gateway 108. Gateway 108 is typically a switch or a computer that couples and provides protocol conversion for data traffic between cellular telephone network 107 and wide area network 106. Server 105 can have, for example, a hypertext "web" interface and provides access to a database having location-relevant information.

FIG. 2 shows one implementation of ILM 101 by circuit 200. As shown in FIG. 2, circuit 200 includes central processing unit (CPU) 201, which is typically a general-purpose microprocessor, such as a Motorola 68331 microprocessor. CPU 201 is the main controller of the system. Crystal oscillator 202 provides a time reference for circuit 200. Flash memory module 203 and static random access memory (SRAM) 204 provide non-volatile and volatile storage for CPU 201. In this embodiment, flash memory module 203 provides 512 K-bytes of non-volatile storage, and SRAM 204 provides 128 K-bytes of storage. The non-volatile storage is used primary for storing the firmware of ILM 101, GPS look-up tables for positioning information calculation, and configuration parameters, such as device identification. SRAM 204 provides run-time storage, such as positioning information—position, velocity and time (PVT).

Battery 205 maintains the content of SRAM 204. Real time clock (RTC) and system controller 206 provides a real time clock and non-volatile random access memory (NVRAM) control. In addition RTC controller 206 includes an analog-to-digital (A/D) converter. In this embodiment, the A/D converter is used to receive ignition, temperature and GPS antenna data. RTC and system controller 206, which receives a clock signal from 32.768 KHz oscillator 216, can be implemented, for example, by an integrated circuit DS 1670E, which is available from Dallas Semiconductor.

GPS RF front-end 208 and GPS Engine 207 implement the GPS signal processing functions of ILM 201. In this embodiment, GPS RF front-end 208 can be implemented by four VRF-2 application specific integrated circuits (ASIC) or a VRF-12 ASIC, all of which are integrated dual conversion front end ASICs available from @Road, Inc. GPS RF ASIC 208 receives L1 (1575.42 MHz) GPS signal, and provide a down-converted bandpass 2-bit quantized signal for data processing. GPS Engine 207, which receives down-converted signals from GPS RF front-end 208 and provides signal processing to compute PVT information for ILM 201. In this embodiment, GPS Engine 208 can be implemented by a VGP-12 ASIC available from @Road, Inc. In this embodiment, GPS Engine 207 provides a memory-mapped interface to CPU 201, a GPS clock controller, and GPS correlator channels with common control, receiver gain control, and parallel and serial ports. In this embodiment, GPS Engine 207 communicates with CPU 201 over a 16-bit parallel bus. One example of GPS signal data processing is disclosed in U.S. Pat. No. 5,990,827, entitled "Structure of a Position Processing Apparatus," to Fan et al., filed Mar. 28, 1997, which is also assigned to @Road, Inc., the assignee also of this invention.

Modem 210 provides an interface to an external communication system, such as a cellular telephone network. Modem 210 allows ILM 101 to communicate with server 105 over the external communication system and gateway 108. In this embodiment, modem 210 can be implemented, for example, by a Novatel NRM-6812 modem card. Modem 210 communicates with CPU 201 over input-output (I/O) bus 217. Modem 210 receives a serial bit stream from and transmits a serial bit stream to a built-in universal asynchronous receiver and transmitter (UART) in GPS Engine 207.

ILM 101 communicates with external circuits through industry standard interfaces at one or more data ports, such as data ports 212 and 213 of circuit 200. In one implementation, circuit 200 communicates over output port 212, provided as an RS-232 interface, with a multimedia output device during normal operation, and a configuration tool and a debugging tool during manufacturing and testing. A multimedia output device provides video output, audio output or both. Data port 213 is provided to interface with additional external devices and systems. In one embodiment, described in further detail below, data port 213 is implemented as an interface to a docking station of a hand-held device. Such a docking station can be provided with a radio frequency (RF) link to the handheld device using infra-red, 900 MHz, FRS or other local wireless technology. In one embodiment, the handheld device may be a cellular telephone, a personal digital assistant, another position device, a data collection device, or a similar device. Such a handheld device includes a cellular telephone that allows it to communicate with a third party (e.g., server 105) over a cellular telephone connection.

In addition, circuit 200 provides visual status indicators to an operator of the vehicle using LEDs 213. Some examples of status indicators that can be implemented by LEDs 213 include power on/off, active/inactive communication with external communication network, operative/non-operative status of the GPS system in circuit 200, active/inactive link to server 105. In this embodiment, input and output terminals 215 provide additional means for input and output control signals that can be used by the firmware of ILM 101.

The firmware in ILM 101 can be loaded and updated using over-the-air programming (OTAP) through modem 210. OTAP can be provided using industry standard TFTP ("trivial file transfer protocol"). In TFTP, a TFTP file server is provided from which ILM 101 can request one or more files under operator control, or control by server 105. Upon receiving the requested file, ILM 101 is reconfigured by executing a programming file to load the new firmware into non-volatile memory 203. The programming file can be one of the files transferred under TFTP.

Figure 6:
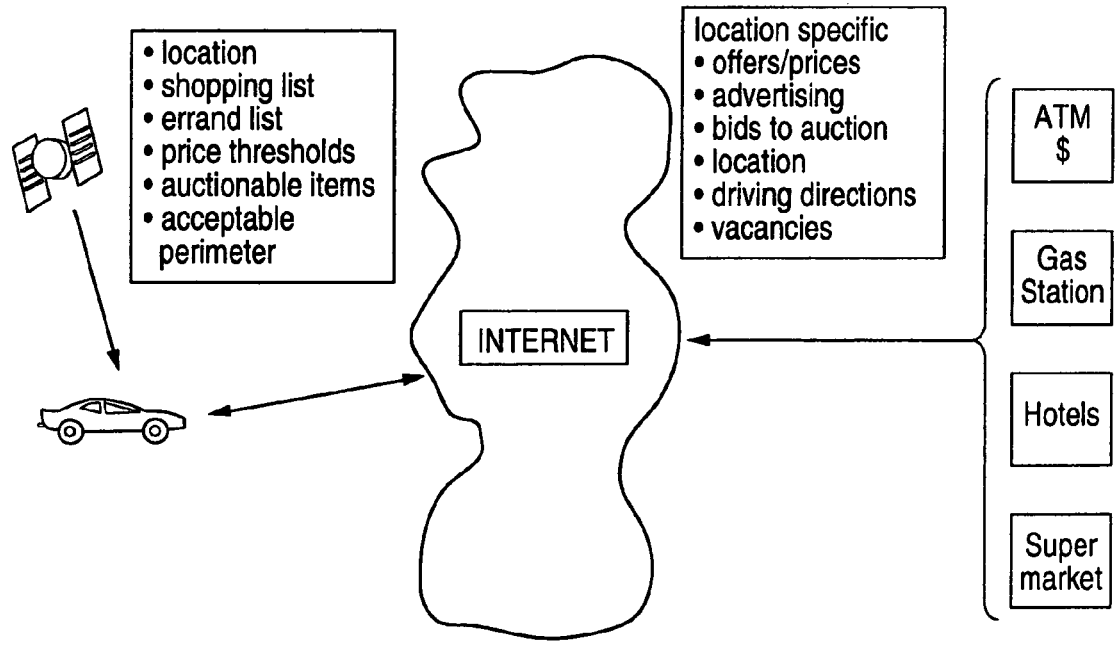
FIG. 6 illustrates examples of location-relevant services that can be delivered to an operator of a vehicle, in accordance with another aspect of the invention.

Using ILM 101, a large number of location-relevant services can be delivered to an operator of a vehicle. Some examples of such location-relevant services are illustrated by FIG. 6. For example, based on the location of the vehicle reported by ILM 101, server 105 can provide the operator driving directions to a specific destination, to a nearest gas station, hotel or motel, cinema, or an automatic teller machine etc. In addition, server 105 can provide price information regarding these facilities, vacancies or occupancy conditions in these nearby hotels or motels. In one application, server 105 can provide the vehicle operator access to e-commerce sites (e.g., on-line travel agencies), where the operator can obtain more information regarding a service, make a reservation, negotiate a price or arrange for payment of a service in advance of his or her arrival at a facility. Server 105 can also allow operators of these facilities to compete for the vehicle operator's business. For example, server 105 can provide discount offers to the vehicle operator from a particular merchant who has made arrangements with server 105 to provide such discount to its subscribers. Alternatively, the vehicle operator can publish his or her need for a particular service on server 105, which then allows providers of the service to bid for the vehicle operator's business under, for example, a reversed auction mechanism.

In these instances, a commercial transaction is facilitated by the dynamically determined location of one party of the transaction. In fact, in some instances, neither party of the transaction need be stationary! For example, an operator of a vehicle that has unexpectedly broken down on the road can be matched up with a traveling mechanic, not from a stationary garage, but who moves from job to job carrying all his or her equipment in a truck. Previously, such a transaction would not be possible without involving a human dispatcher.

For many products and services, the distance between the provider and the consumer is not predictable in advance. As a result, in pricing the product or service, the merchant often prices by allocating the cost of transportation, which can be a significant variable in the cost for providing a product or a service and can vary quite significantly with distance, to all customers equally without regard to the actual transportation cost with respect to each customer. However, with the system described above, the customer's current location can be easily obtained from server 105. As a result, pricing according to a more precise estimate of transportation cost is possible, thus allowing commerce to be more efficiently conducted, and allowing merchants to compete more effectively.

In one embodiment, the operator maintains a "things-to-do" list on server 105. In that application, the operator specifies the time, the location, or both, at which each item on the list is to be performed. As ILM 101 reports its location, server 105 compares the time or location against items on the list. An appropriate alert, together with other helpful location-relevant services, is delivered to the operator of the vehicle when the location or time, or both, specified for an item list is approached.

Figure 3:
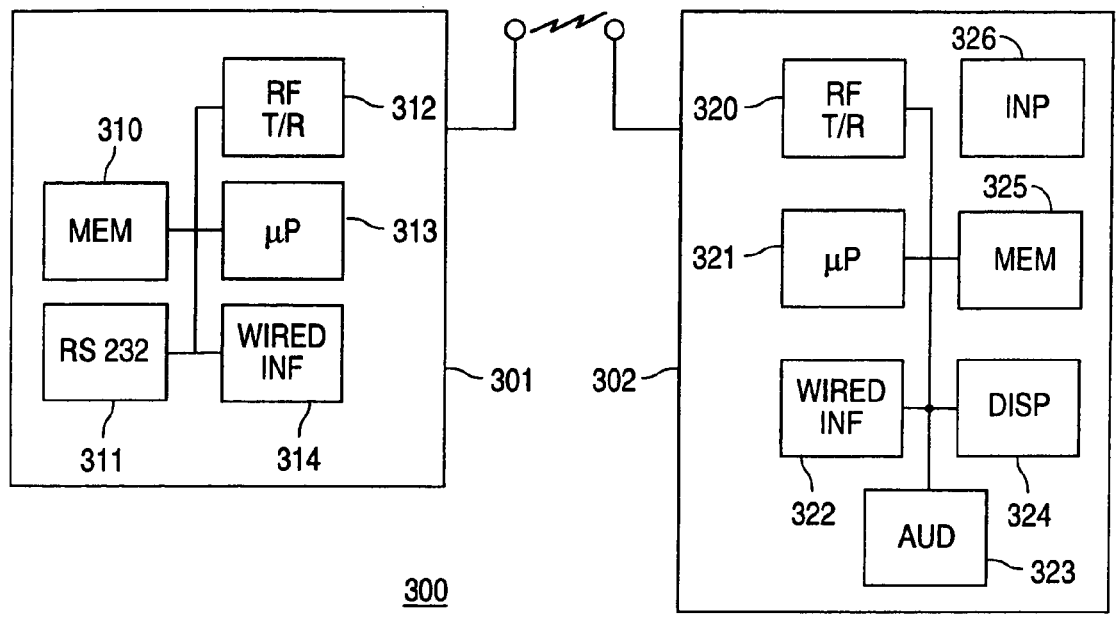
FIG. 3 shows system 300, including docking station 301 and handheld device 302, suitable for use in one embodiment of the present invention.

As mentioned above, in one embodiment, data port 213 communicates with a docking station for a handheld device. FIG. 3 shows an example of such a system 300, including docking station 301 and handheld device 302. As shown in FIG. 3, controller 313, which can be implemented, for example, by a microprocessor, controls docking station 301. Firmware for controller 313 can be stored in memory 310, which may include a read-only component. To communicate with ILM 101 over data port 213, docking station 301 includes interface 311 (e.g., an RS-232 interface). System 300 provides a wired connection between docking station 301 and handheld device 302 through wired interface 314, when handheld device 302 is docked. In system 300, when handheld device is removed from docking station 301, a wireless link can be activated using wireless transmitter-receiver 312 between docking station 301 and handheld device 302.

As shown in FIG. 3, handheld device 302 is controlled by a controller 321 and includes memory 325, which provides both firmware and run time storage. Wired interface 322 and wireless transmitter-receiver 320 maintain the wired and wireless communication links with docking station 301. In addition, handheld unit includes input device 326 and output devices 323 and 324. In one embodiment, output device 324 includes an LCD or plasma display to provide text and graphical output. Output device 323 includes a sound reproduction subsystem that provides audio output through a speaker (not shown) to an operator of handheld device 302. In this embodiment, input device 326 includes a touch-sensitive tabloid or a keyboard mounted in a housing that includes also output device 323. In addition, handheld device 302 can also be provided with a capability to maintain an independent second wireless link (e.g., over a cellular telephone network) with a third party.

Figure 4:
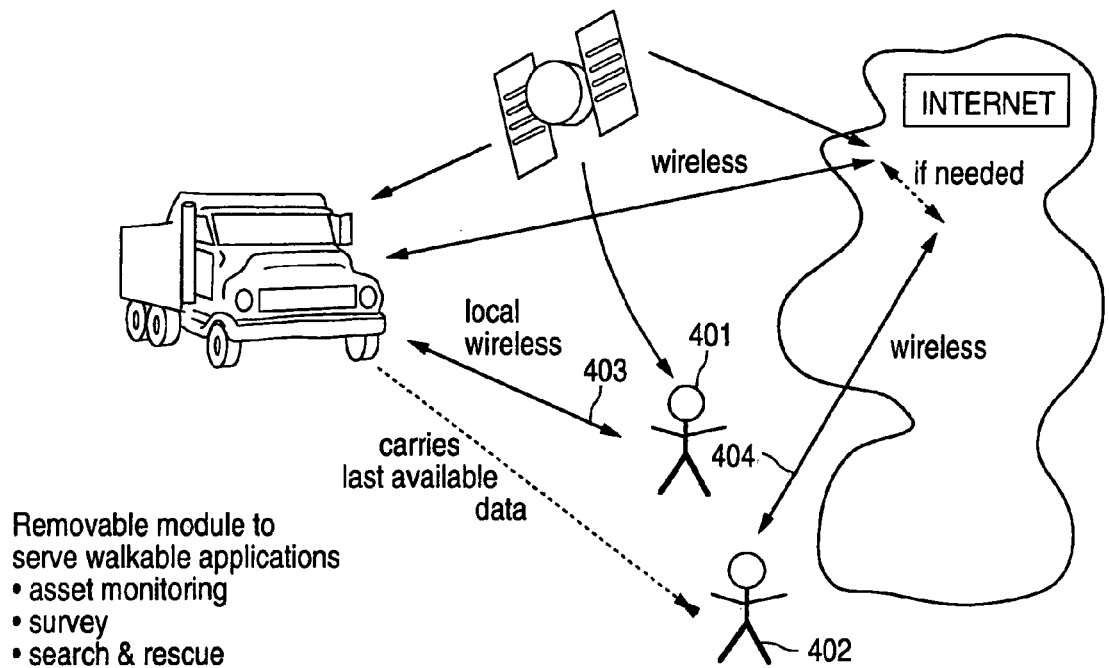
FIG. 4 illustrates two modes of operation of system 300 in conjunction with ILM 101, according to one embodiment of the present invention.
Figure 5:
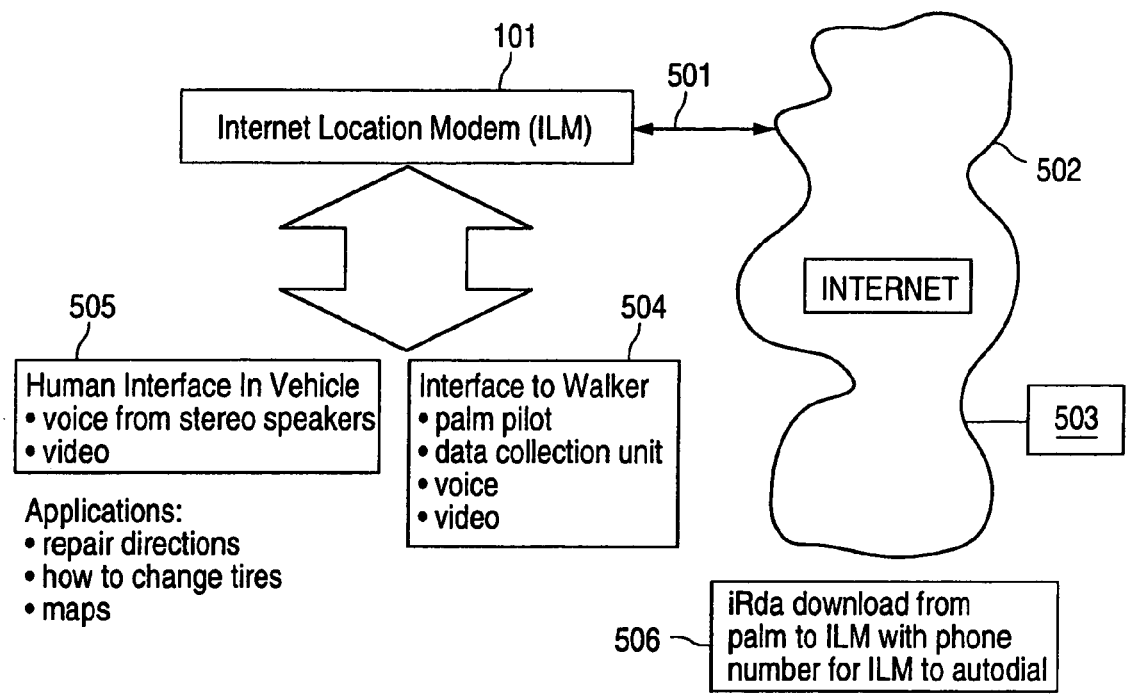
FIG. 5 illustrates location-relevant services that can be achieved using system 300 in conjunction with ILM 101, according to another aspect of the present invention.

FIGS. 4 and 5 illustrate location-relevant services that be achieved using ILM 101, in conjunction with system 300.

FIG. 5 illustrates location-relevant services that can be achieved using system 300 in conjunction with ILM 101, according to one aspect of the present invention. As shown in FIG. 5, ILM 101 maintains communication link 501 over the Internet with server 503 to provide services to an operator of a vehicle, using the methods described above with respect to FIG. 1. For example, in one application, server 105 may provide directions to a destination to the operator based on the current location of the vehicle. The information (e.g., textual description of turn-by-turn directions, or a map) from server 101 can be displayed on a display device connected to data port 212, for example. Additional multimedia output (e.g., voiced directions) is also possible. In another application, server 105 can provide, for example, emergency road-side assistance (e.g., step-by-step directions to change a flat tire, or emergency repair instructions). However, in some instances, the operator may require such services away from ILM 101. For example, step-by-step instructions for changing a flat tire is best delivered to the operator as he or she carries out the tire-changing procedure. Alternatively, to perform such tasks as inventory control or asset monitoring, an ability to maintain connection with server 105 while moving around within a small local vicinity is valuable. Handheld device 302 can provide services away from ILM 101.

When handheld device 302 is docked at docking station 301, handheld device 302 can communicate with ILM 101 over wired interfaces 314 and 322, interface 311 and data port 213. While handheld device 302 is docked at docking station 301, handheld device 302 can remain idle. Alternatively, input device 326 and output devices 323 and 324 can be used to allow the user to interact with server 105. However, when handheld device 302 is removed from docking station 301, input and output operations directed to ILM 101 are carried out on hand held device 302, using input and output devices 323 and 324 and the wireless link maintained by receiver-transmitters 312 and 320. Thus, an operator changing a flat tire can, for example, have handheld unit 302 by his or her side to receive step-by-step instructions (services 504). This operation is illustrated by operation mode 401, in which the operator maintains a limited-range wireless link (i.e., between receiver-transmitters 312 and 320.) Alternatively, communication between ILM 101 and server 105 can be initiated from handheld device 302 over wireless link 403 (services 506 of FIG. 5).

Since wireless link 403 typically has a limited range, the present invention can provide an additional wireless communication link 404 directly with server 105, under operation mode 402. Under operation mode 402, a wireless link need not be maintained between handheld unit 302 and docking station 301, i.e., the operator of the vehicle be away from ILM 101 beyond the range of local wireless link 403. For example, if the vehicle breaks down at an inconvenient location, the operator may need to obtain help beyond the range of local wireless link 403. Under operation mode 402, if wireless link 403 is not maintained between docking station 301 and handheld unit 302, handheld unit stores the last position of ILM 101 at the time handheld unit 302 is removed from the docking station. Server 105 can provide location-specific services for the operator of the vehicle, using this last stored location of ILM 101.

The detailed description above is provided to illustrate specific embodiments of the present invention and is not intended to be limiting. Numerous variations and modifications within the scope of the present invention are possible. For example, while the above detailed description describes docking station 301 as a device between ILM 101 and handheld unit 302, the docking station can be eliminated within the scope of the present invention by providing in ILM 101 an additional wireless communication interface to allow direct wireless communication between handheld unit 302 and ILM 101. As another example, while the embodiments provide for illustration purpose only server 105, in practice, any number of servers can be provided. In addition, these servers can also share amongst themselves location information from either ILM 101 or handheld unit 302, and each server can independently provide ILM 101 and handheld unit 302 location-relevant services. The present invention is set forth in the accompanying claims.

We claim:

1. A system for providing location-relevant information from a server over a wide-area computer network, comprising:
   a positioning device receiving ranging signals for determining a current position of said positioning device, said positioning device having a communication interface for communicating with said server over a wireless link in said wide-area computer network;
   a wireless interface coupled to said positioning device; and
   a handheld device coupled over a second wireless link to said wireless interface, said handheld device comprising an input device for providing data over said second wireless link and an output device for receiving data over said second wireless link;
   wherein said positioning device being programmed to provide data received from said server to said handheld device through said wireless interface, and to provide data received from said wireless interface to said server.

2. A system as in claim 1, wherein said handheld device comprises a cellular telephone.

3. A system as in claim 1, wherein said handheld device comprises a personal digital assistant.

4. A system as in claim 1, wherein said second wireless link comprises a local radio frequency communication link.

5. A system as in claim 1, wherein said second wireless link comprises an infra-red communication link.

6. A system as in claim 1, wherein said wireless interface is provided inside said positioning device.

7. A system as in claim 1, wherein said wireless interface is provided in a docking station.

8. A system as in claim 7, wherein said docking station and said handheld device are each provided a wired interface for communication with each other when said handheld device is docked in said docking station.

9. A system as in claim 1, wherein said input device comprises a keyboard.

10. A system as in claim 1, wherein said output device comprises a display device.

11. A system as in claim 2, wherein said handheld device being programmed to provide a communication link outside of said positioning device with said server.

12. A system as in claim 11, wherein stored in said handheld device is a value representing a current location of said positioning device at a previous time.

13. A system as in claim 1, wherein said server provides location-relevant services.

14. A system as in claim 1, wherein said handheld device is programmed to be capable of initiating communication with said server through said positioning device.

15. A system as in claim 1, wherein said server is one of a plurality of servers sharing said current position.

* * * * *